United States Patent
Sirois

(10) Patent No.: US 7,692,352 B2
(45) Date of Patent: Apr. 6, 2010

(54) APPARATUS AND METHOD FOR COOLING ROTOR AND STATOR MOTOR CORES

(75) Inventor: Robert David Sirois, Fortwayne, IN (US)

(73) Assignee: General Electric Company, Schenectady, NY (US)

( * ) Notice: Subject to any disclaimer, the term of this patent is extended or adjusted under 35 U.S.C. 154(b) by 282 days.

(21) Appl. No.: 11/849,701

(22) Filed: Sep. 4, 2007

(65) Prior Publication Data

US 2009/0058204 A1  Mar. 5, 2009

(51) Int. Cl.
*H02K 1/00* (2006.01)

(52) U.S. Cl. .......................... 310/216.004; 310/216.14; 310/217; 310/52

(58) Field of Classification Search .................. 310/216.001–216.137, 52–59, 217
See application file for complete search history.

(56) References Cited

U.S. PATENT DOCUMENTS

| | | | |
|---|---|---|---|
| 1,487,221 A * | 3/1924 | Ehrmann ..................... 310/58 |
| 3,684,906 A | 8/1972 | Lenz |
| 4,012,653 A * | 3/1977 | Shigeta et al. .............. 310/432 |
| 4,286,182 A * | 8/1981 | Lenz ........................... 310/61 |
| 4,301,386 A * | 11/1981 | Schweder et al. ............. 310/59 |
| 4,365,178 A | 12/1982 | Lenz |
| 4,395,816 A * | 8/1983 | Pangburn ..................... 29/598 |
| 5,563,460 A * | 10/1996 | Ammar ....................... 310/59 |
| 5,859,483 A | 1/1999 | Kilman |
| 6,396,176 B1 * | 5/2002 | Mokri ......................... 310/58 |
| 6,495,943 B2 * | 12/2002 | Wetzel et al. ............... 310/264 |
| 6,727,609 B2 * | 4/2004 | Johnsen ....................... 310/52 |

* cited by examiner

*Primary Examiner*—Thank Lam
(74) *Attorney, Agent, or Firm*—GE Global Patent Operation

(57) ABSTRACT

A laminated core for a motor includes a plurality of laminations each of which are disposed in a non-spaced relation to an adjacent lamination and each of which have a disc-like configuration and wherein the plurality of laminations are each dimensioned and configured to provide for a flow of a cooling fluid traveling in a radial direction to a rotational axis of the motor. A method of cooling a motor is also presented.

26 Claims, 7 Drawing Sheets

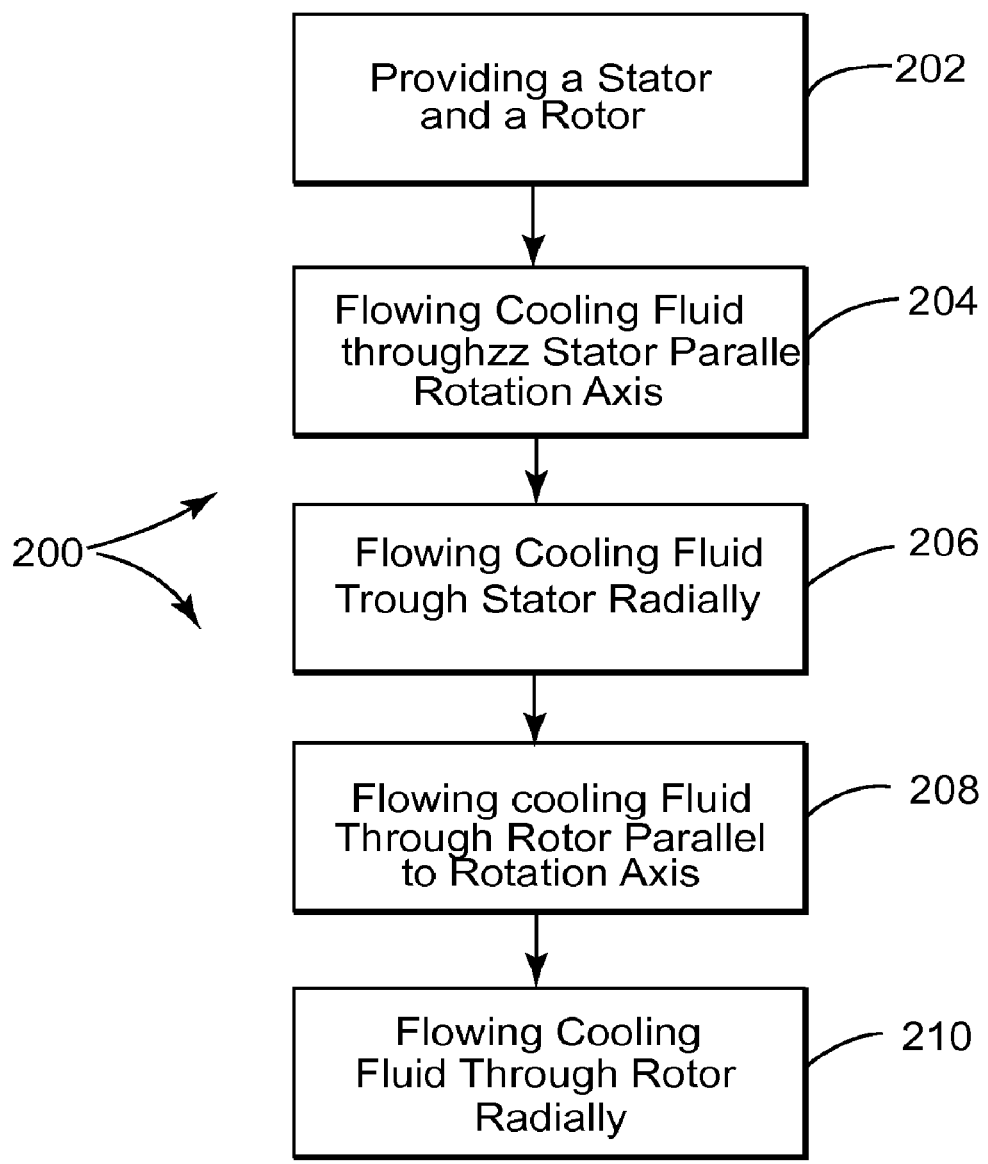

APPARATUS AND METHOD FOR COOLING ROTOR AND STATOR MOTOR CORES

BACKGROUND OF THE INVENTION

1. Field of the Invention

The subject matter described herein relates generally to motors and, more particularly, to devices and methods for cooling rotor and stator cores.

2. Related Art

Presently, a known method of cooling a motor includes ventilating a rotor and/or a stator core using spacers. In general, a core may comprise laminations and the spacers may be mounted between each lamination. The spacers may be configured as I-beams, blocks or packets where the I-beams and the blocks simply function to space the laminations and allow for the flow of cooling air between the laminations. Spacer packets may include a central bore that communicates with an aperture of each lamination that it is disposed between and thus may provide for a flow of cooling air transversely through the laminations.

One disadvantage to the above methods is that each requires fixing of the spacers between laminations thereby substantially increasing fabrication costs. Accordingly, to date, no suitable device or method for cooling a motor is available.

BRIEF DESCRIPTION OF THE INVENTION

In accordance with an embodiment of the present invention, laminations for a laminated core of a motor comprise at least one inner vent lamination that comprises a generally disc-like shape and at least one inner port and wherein the at least one inner vent lamination has a continuous peripheral surface. At least one outer vent lamination is also provided which comprises a generally disc-like shape and at least one outer port that is configured whereby the at least one outer vent lamination has a discontinuous peripheral surface. The at least one inner port and the at least one outer port are each dimensioned and configured to communicate to define a radial cooling duct extending in a generally radial direction when the at least one inner vent lamination and the at least one outer vent lamination are assembled together.

In another aspect of the invention, a laminated core for a motor comprises a plurality of laminations each of which are disposed in a non-spaced relation to an adjacent lamination and each of which have a disc-like configuration and wherein the plurality of laminations are each dimensioned and configured to provide for a flow of a cooling fluid traveling in a radial direction to a rotational axis of the motor.

In a further aspect of the invention, a method of cooling a motor, comprises providing a stator and a rotor each comprising a plurality of non-spaced laminations; flowing cooling fluid through the stator in a direction parallel to a rotational axis of the motor; flowing cooling fluid through the stator in a direction radial to the rotational axis of the motor; flowing cooling fluid through the rotor in a direction parallel to a rotational axis of the motor; and flowing cooling fluid through the rotor in a direction that is generally radial to the rotational axis of the motor.

BRIEF DESCRIPTION OF THE DRAWINGS

The following detailed description is made with reference to the accompanying drawings, in which:

FIG. 11 is a diagram showing a method of cooling a motor.

DETAILED DESCRIPTION OF THE PREFERRED EMBODIMENT

One embodiment of the present invention concerns a device and a method for cooling a motor that comprises a laminated core of non-spaced laminations that are dimensioned and configured to provide for both a laminar flow and a turbulent flow of cooling fluid through the laminations. In this way, fabrication costs are substantially reduced by the omission of fixing spacers between laminations.

Figure 1:
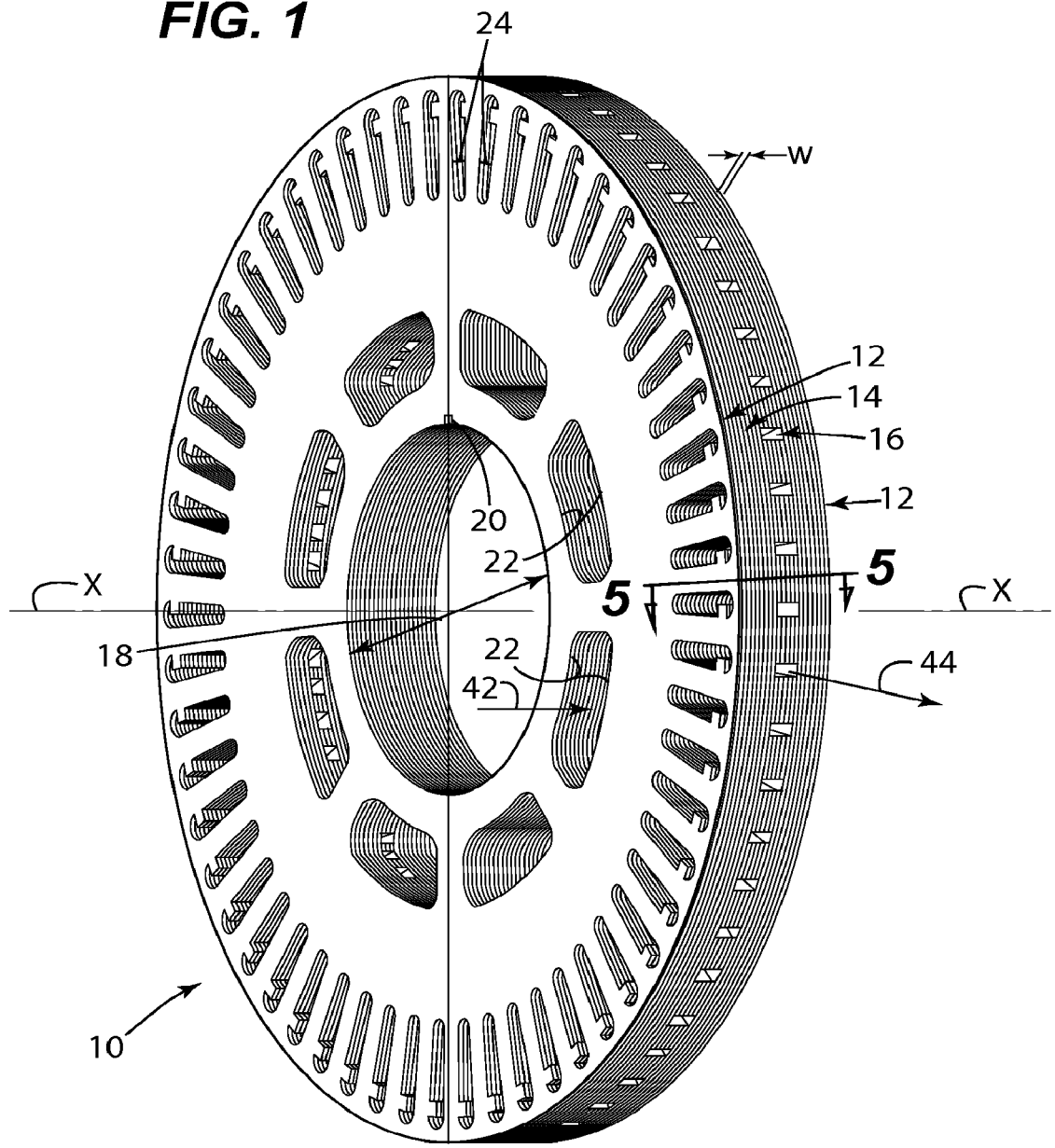
FIG. 1 is a perspective view of a rotor core comprising laminations in accordance with one embodiment of the present invention.

Referring now to FIG. 1, a laminated core in accordance with one embodiment of the present invention is illustrated generally at 10. In this embodiment, the laminated core 10 comprises a plurality of rotor laminations 12, rotor inner vent laminations 14 and rotor outer vent laminations 16. As shown each of the rotor laminations 12, inner vent laminations 14 and outer vent laminations 16 are disposed adjacent each other without any spacers that provide for the flow of a cooling fluid therebetween as provided for in the prior art. Of course each of the laminations may be adhered together and/or encapsulated in a manner that is generally not porous to the flow of a cooling fluid. Accordingly, the terms spacer and non-spaced relation, as used herein, shall not refer to an adhered or encapsulated condition of the laminated core 10. Also it will be appreciated that each of the rotor laminations 12, rotor inner vent laminations 14 and rotor outer vent laminations 16 may each comprise a generally disc-like outer configuration and as such each has a relatively small width (w) relative to an outer diameter (d) thereof, which is best seen FIG. 2. Further, each of the rotor laminations 12, inner vent laminations 14 and outer vent laminations 16 may comprise a ferromagnetic material that may be stamped and/or cut using various cutting mediums such as a laser beam or high pressure water.

As shown, each rotor lamination 12, rotor inner vent lamination 14 and rotor outer vent lamination 16 may comprise a central aperture 18 that includes a key way 20 that is configured, e.g., for mounting to a motor shaft (not shown). A first plurality of cooling apertures 22 are provided for cooling purposes and are spaced circumferentially and radially from the aperture 18. A fan (not shown) may be employed to create a laminar flow of cooling fluid that passes through the apertures 22 in a generally parallel direction to a rotational axis (x).

Figure 2:
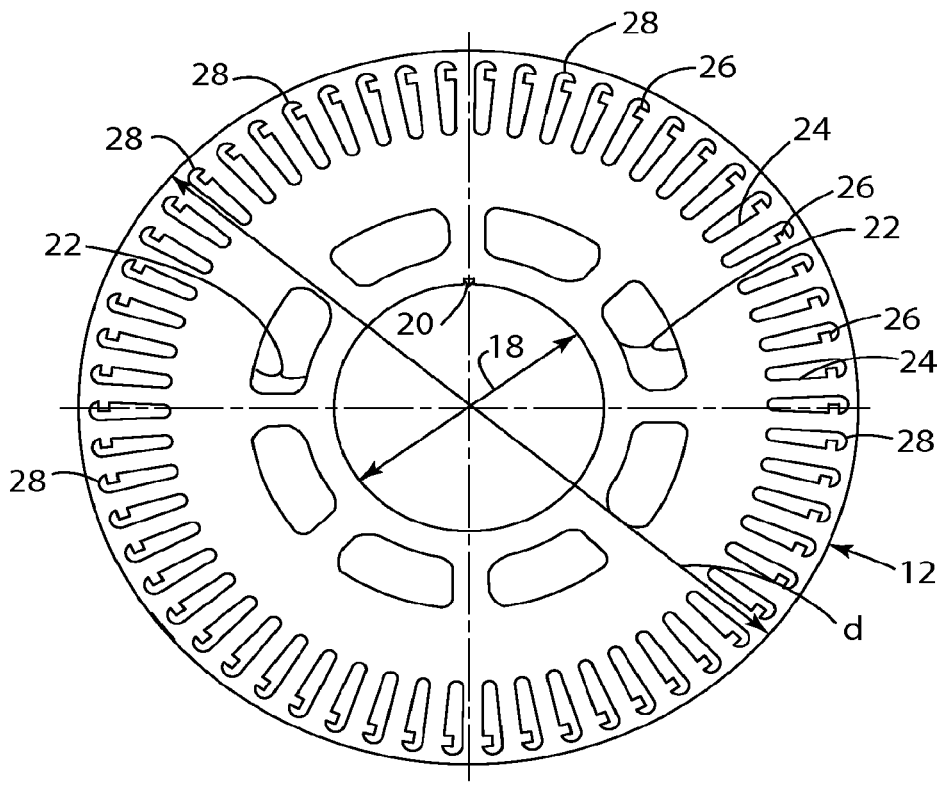
FIG. 2 is a diagram showing a rotor lamination of the rotor core of FIG. 1.

Referring now also to FIG. 2, each rotor lamination 12, rotor inner vent lamination 14 and rotor outer vent lamination 16 comprises a plurality of apertures 24 which generally contain a conductive material such as copper or aluminum (not shown). As shown in this particular illustrated example, each wiring aperture comprises a tab 26 and a triangular shaped end portion 28 that are well known to be configurable in various geometries to achieve various electromagnetic properties of the motor.

Figure 3:
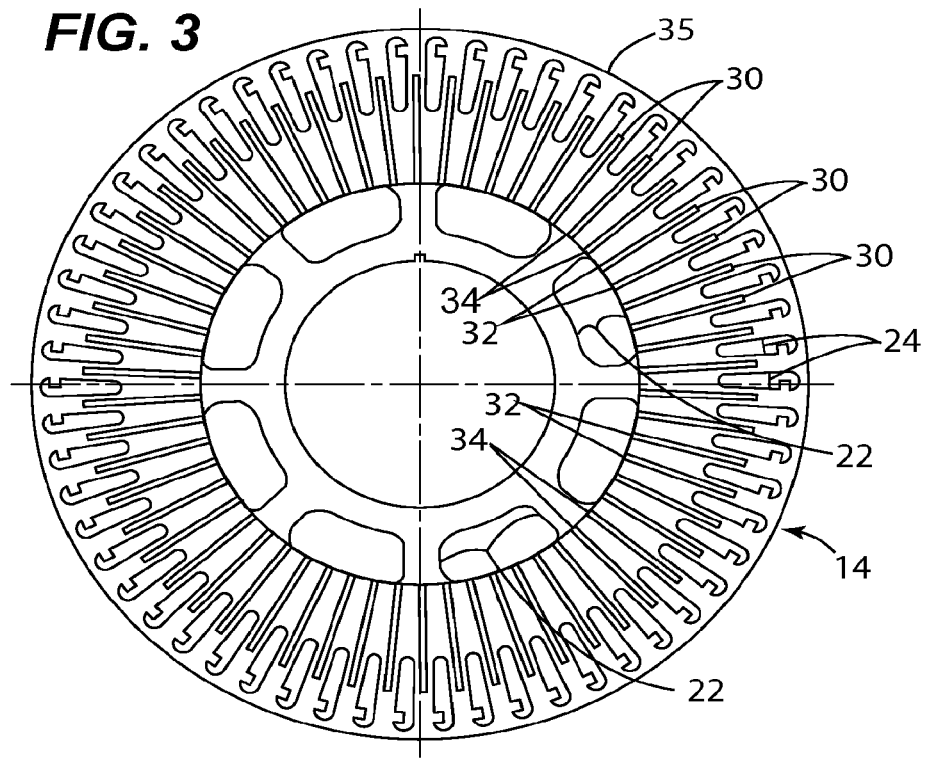
FIG. 3 is a diagram showing an inner vent lamination of the rotor core of FIG. 1.

As illustrated in FIG. 3, the rotor inner vent lamination 14 comprises inner ports 30 that are circumferentially, and radially, spaced from, the cooling apertures 22. Where disposed adjacent a cooling aperture, the inner ports 30 each have an open end 32 that communicates with the cooling apertures 22. In other instances, the inner port 30 is closed at a terminal end 34. The rotor inner vent lamination 14 also comprises a continuous periphery 35. It will be appreciated that while inner ports are shown as generally rectangular in configuration, any suitable geometrical configuration that provides suitable structural support, and fluid flow, for the rotor inner vent lamination 14, may be employed. At least one inner port 30 may be provided, although, it will be understood that any number of inner ports may be employed in the practice of the invention.

Figure 4:
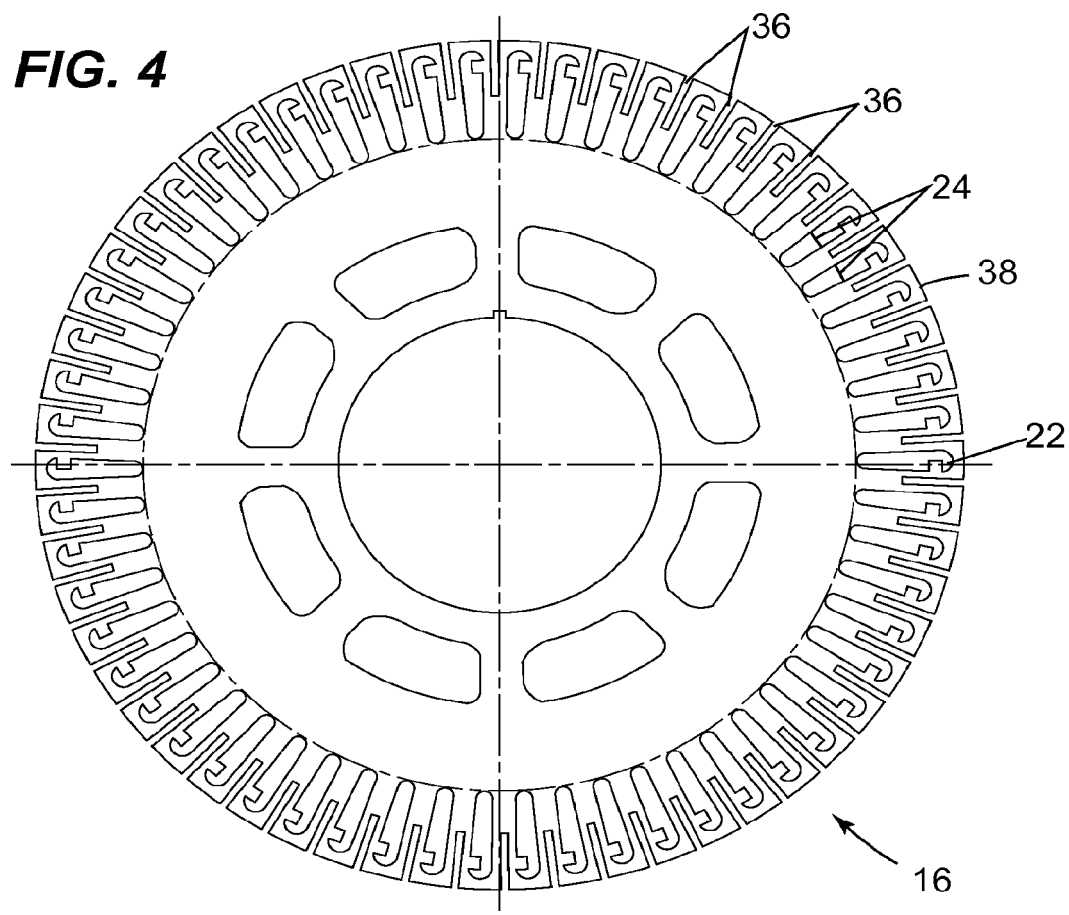
FIG. 4 is a diagram showing an outer vent lamination of the rotor core of FIG. 1.

FIG. 4 shows the rotor outer vent lamination 16 that comprises outer ports 36 that are also circumferentially, and radially, spaced from the cooling apertures 22. The outer ports 36 may also be dimensioned and configured to overlap in a radial direction with the inner ports 30 (FIG. 3) as will be shown and described in more detail below. The outer ports 36 comprise open terminal ends (not numbered) whereby rotor outer vent lamination 16 also comprises a discontinuous outer periphery 38. Similar to the inner ports 30, it will be appreciated that while the outer ports 36 are shown as generally rectangular in configuration, any suitable geometrical configuration that provides suitable structural support, and fluid flow, for the rotor outer vent lamination 16, may be employed. At least one outer port 36 may be provided, although, it will be understood that any number of outer ports may be employed in the practice of the invention.

Figure 5:
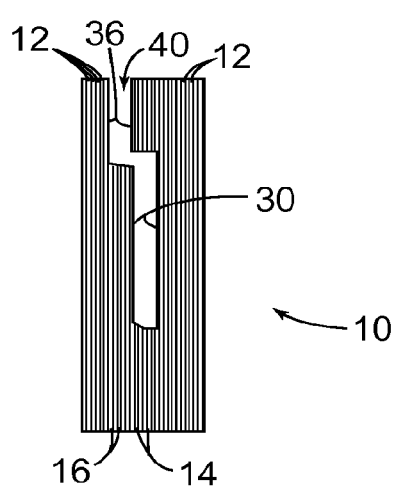
FIG. 5 is a section taken along line 5 of FIG. 1 showing rotor laminations, inner vent laminations and outer vent laminations assembled together.

Referring now to FIG. 5, a section of the laminated core 10 is shown which comprises rotor laminations 12, rotor inner vent laminations 14 and rotor outer vent laminations 16 assembled together. As seen, the inner ports 30 are configured to communicate with the outer ports 36 to define a radial cooling duct 40 that extends between the cooling apertures 22 (FIG. 1) and the outer periphery of the laminated core 10. In operation, and referring also to FIG. 1, a cooling medium, such as air, may travel in an axial direction along arrow 42, through the radial cooling duct 40 and out in the radial direction illustrated by arrow 44. In this way and in addition to a laminar flow of coolant fluid, a turbulent flow in the direction of arrow 44 is also created.

In accordance with another aspect of the present invention, a laminated core is shown generally at 100. The laminated core 100 comprises a plurality of stator laminations 113, stator inner vent laminations 115 and stator outer vent laminations 117. It will be appreciated that the laminated core 100 may be employed together with the laminated core 10 in, e.g., a motor. Also, it will be understood that, optionally, either of the laminated cores 10 and 100 may be employed separately in, e.g., a motor. Further, it will be understood that the laminated core 100 may be similar in many aspects to the laminated core 10, described above, and therefore, for clarity, reference may be had above for further details beyond that described below. Reference numerals for similar elements, although in the form of a stator instead of a rotor, are similarly labeled as those above excepting that they are preceded by one hundred.

Figure 7:
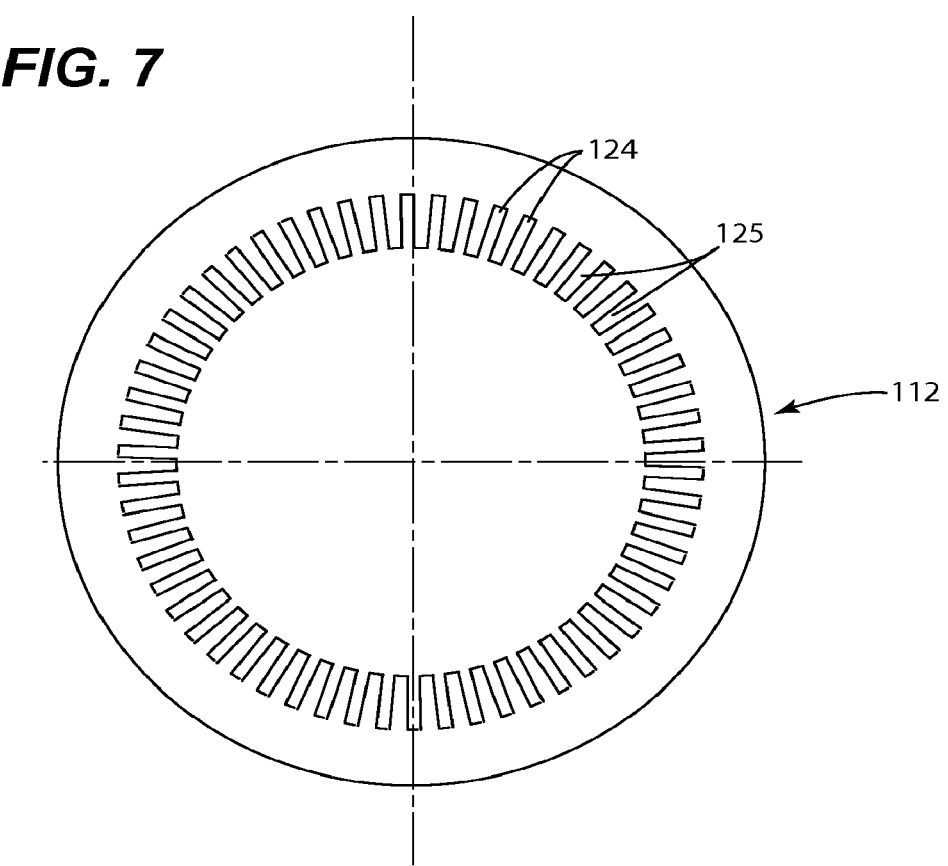
FIG. 7 is a diagram showing a stator lamination of the stator core of FIG. 6.

The stator lamination 112 is best seen in FIG. 7 and comprises wiring apertures 124 disposed between wiring posts 125.

Figure 8:
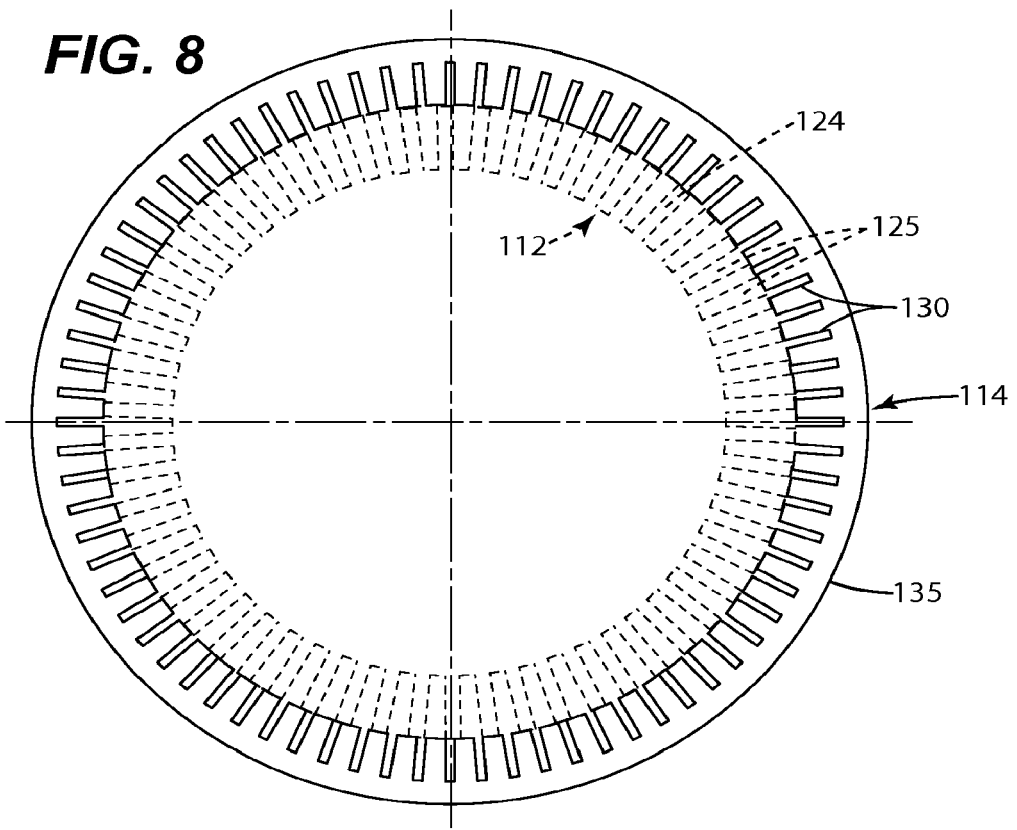
FIG. 8 is a diagram showing an inner vent lamination of the stator core of FIG. 6 assembled to a stator lamination (shown in phantom)

Referring now to FIG. 8, the stator inner vent lamination 114 comprises inner ports 130, which when assembled to the stator lamination 112, represented in phantom, terminate between wiring posts 125. The stator inner vent lamination 114 has a continuous outer periphery 135.

Figure 9:
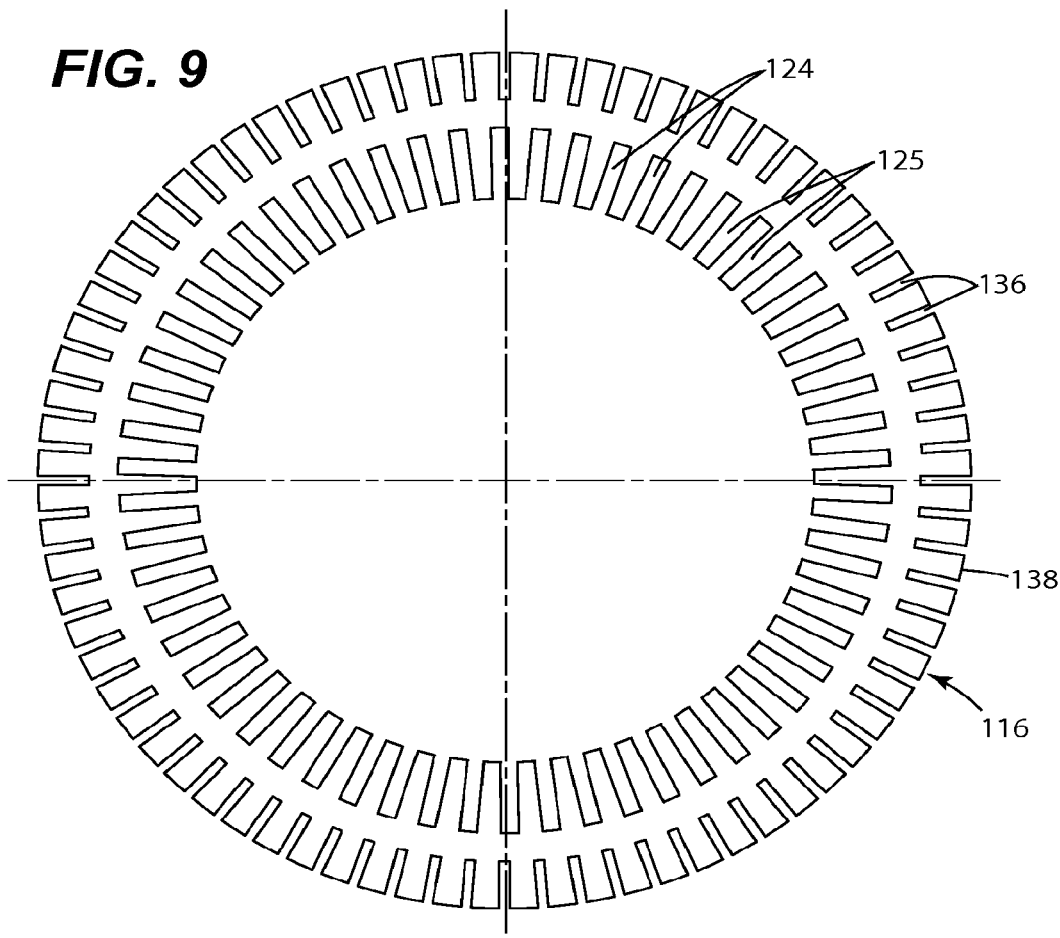
FIG. 9 is a diagram showing an outer vent lamination of the stator core of FIG. 6.

Turning to FIG. 9, the stator outer vent lamination 116 comprises outer ports 136 and a discontinuous outer periphery 138.

Figure 6:
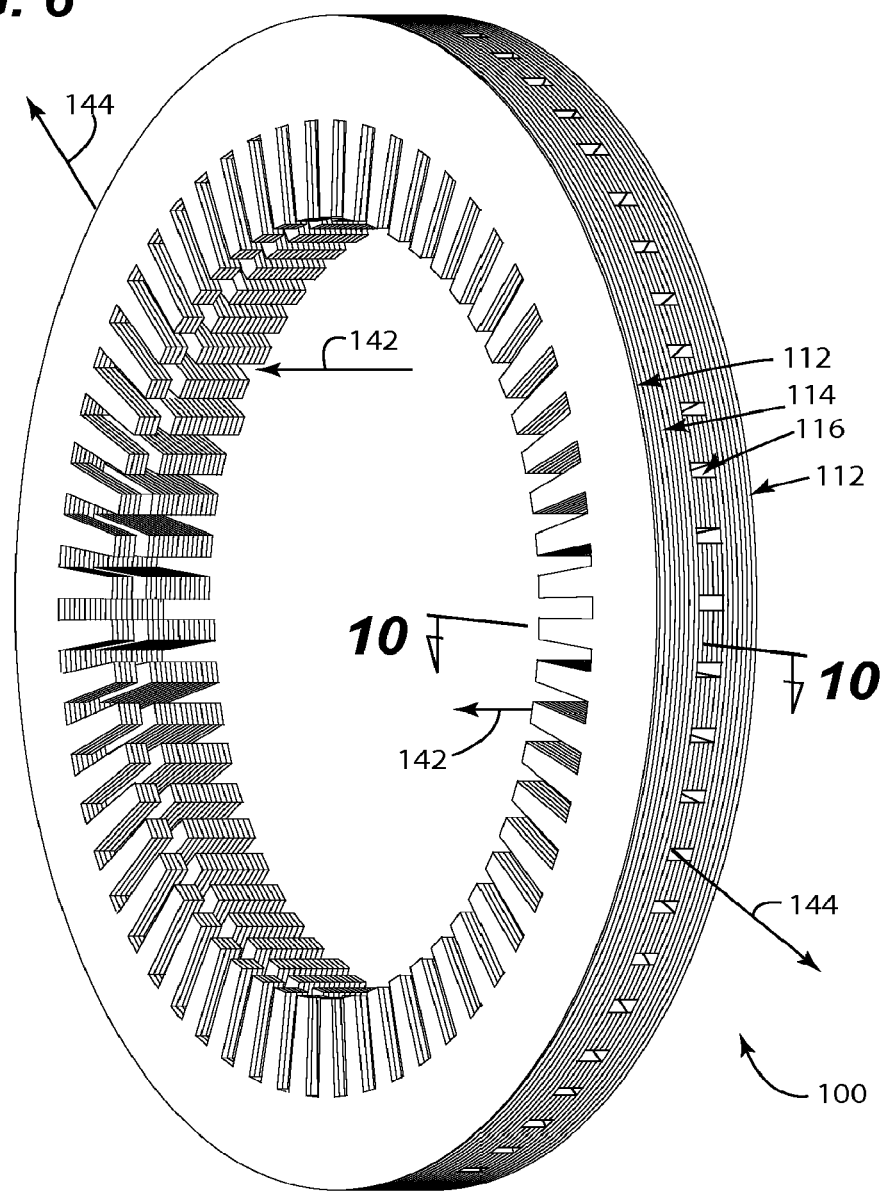
FIG. 6 is a perspective view of a stator core comprising stator laminations in accordance with another aspect of the present invention.
Figure 10:
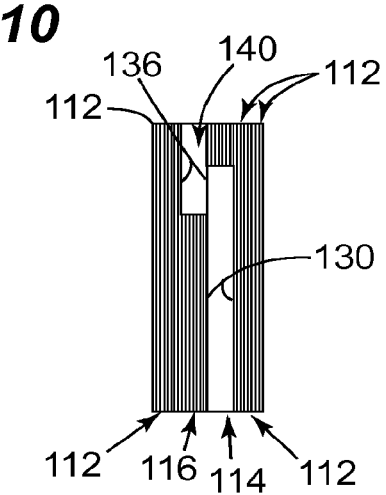
FIG. 10 is a section taken along line 10 of FIG. 6 showing stator laminations, inner vent laminations and outer vent laminations.

FIG. 10 illustrates that the inner ports 130 are configured to communicate with the outer ports 136 to define a radial cooling duct that extends between the wiring posts 125 and the outer periphery of the laminated core 100. In operation, and referring also to FIG. 6, a cooling medium, such as air, may travel in an axial direction along arrow 142, through the radial cooling duct 140 and out in the radial direction illustrated by arrow 144. In this way and in addition to a laminar flow of coolant fluid, a turbulent flow in the direction of arrow 144 is also created.

Referring now to FIG. 11, a method of cooling a motor, in accordance with another aspect of the present invention, is shown generally at 200. The method comprises providing a stator and a rotor each comprising a plurality of non-spaced laminations as shown at 202; flowing cooling fluid through the stator in a direction parallel to a rotational axis of the motor as shown at 204; flowing cooling fluid through the stator in a direction radial to the rotational axis of the motor as shown at 206; flowing cooling fluid through the rotor in a direction parallel to a rotational axis of the motor as shown at 208; and flowing cooling fluid through the rotor in a direction that is generally radial to the rotational axis of the motor as shown at 210.

While the present invention has been described in connection with what are presently considered to be the most practical and preferred embodiments, it is to be understood that the present invention is not limited to these herein disclosed embodiments. Rather, the present invention is intended to cover all of the various modifications and equivalent arrangements included within the spirit and scope of the appended claims.

What is claimed is:

1. Laminations for a laminated core of a motor, comprising:
    at least one inner vent lamination comprising at least one inner port and wherein the at least one inner vent lamination has a continuous peripheral surface; and
    at least one outer vent lamination comprising and at least one outer port that is configured whereby the at least one outer vent lamination has a discontinuous peripheral surface;
    the at least one inner port and the at least one outer port are each dimensioned and configured to communicate to define a radial cooling duct extending in a generally radial direction when the at least one inner vent lamination and the at least one outer vent lamination are assembled together; and
wherein the at least one inner vent lamination and the at least one outer vent lamination are configured for a rotor.

2. The laminations of claim 1, wherein the at least one inner vent lamination comprises a plurality of inner vent laminations each disposed adjacent each other.

3. The laminations of claim 2, wherein the at least one outer vent lamination comprises a plurality of outer vent laminations each disposed adjacent each other and wherein the plurality of inner vent laminations and the plurality of outer vent laminations are mounted together whereby the inner ports and the outer ports each communicate.

4. The laminations of claim 1, wherein:
the at least one inner port comprises a plurality of inner ports circumferentially spaced about the at least one inner vent lamination and wherein each of the inner ports are elongated along a radial direction; and
the at least one outer port comprises a plurality of outer ports circumferentially spaced about the at least one outer vent lamination and wherein each of the outer ports are elongated along a radial direction.

5. The laminations of claim 3, wherein the inner vent laminations and the outer vent laminations each comprise at least one cooling aperture disposed adjacent to each other to define an axial cooling duct.

6. The laminations of claim 5, wherein the at least one cooling aperture comprises a plurality of circumferentially spaced cooling apertures and wherein each circumferentially spaced cooling aperture is disposed adjacent to each other to define a plurality of axial cooling ducts.

7. Laminations for a laminated core of a motor, comprising:
at least one inner vent lamination comprising at least one inner port and wherein the at least one inner vent lamination has a continuous peripheral surface; and
at least one outer vent lamination comprising and at least one outer port that is configured whereby the at least one outer vent lamination has a discontinuous peripheral surface;
the at least one inner port and the at least one outer port are each dimensioned and configured to communicate to define a radial cooling duct extending in a generally radial direction when the at least one inner vent lamination and the at least one outer vent lamination are assembled together; and
wherein the at least one inner vent lamination and the at least one outer vent lamination are configured for a stator.

8. A laminated core for a motor, comprising:
a plurality of laminations each of which being disposed in a non-spaced relation to an adjacent lamination and each having a disc-like configuration and wherein the plurality of laminations each are dimensioned and configured to provide for a flow of a cooling fluid traveling in a radial direction to a rotational axis of the motor; and
wherein the at least one inner vent lamination and the at least one outer vent lamination are configured for a rotor.

9. The laminated core of claim 8, comprising:
at least one inner vent lamination comprising at least one inner port and wherein the at least one inner vent lamination has a continuous peripheral surface; and
at least one outer vent lamination comprising at least one outer port that is configured whereby the at least one outer vent lamination has a discontinuous peripheral surface;
wherein the at least one inner port and the at least one outer port are each dimensioned and configured to communicate to define a radial cooling duct when the at least one inner vent lamination and the at least one outer vent lamination are assembled together.

10. The laminated core of claim 9, wherein the at least one inner vent lamination comprises a plurality of inner vent laminations each disposed adjacent each other.

11. The laminated core of claim 10, wherein the at least one outer vent lamination comprises a plurality of outer vent laminations each disposed adjacent each other and wherein the plurality of inner vent laminations and the plurality of outer vent laminations are mounted together whereby the inner ports and the outer ports each communicate.

12. The laminated core of claim 9, wherein:
the at least one inner port comprises a plurality of inner ports circumferentially spaced about the at least one inner vent lamination and wherein each of the inner ports are elongated along a radial direction; and
the at least one outer port comprises a plurality of outer ports circumferentially spaced about the at least one outer vent lamination and wherein each of the outer ports are elongated along a radial direction.

13. The laminated core of claim 11, wherein the inner vent laminations and the outer vent laminations each comprise at least one cooling aperture disposed adjacent to each other to define an axial cooling duct.

14. The laminated core of claim 13, wherein the at least one cooling aperture comprises a plurality of circumferentially spaced cooling apertures and wherein each circumferentially spaced cooling aperture is disposed adjacent to each other to define a plurality of axial cooling ducts.

15. The laminations of claim 7, wherein the at least one inner vent lamination comprises a plurality of inner vent laminations each disposed adjacent each other.

16. The laminations of claim 15, wherein the at least one outer vent lamination comprises a plurality of outer vent laminations each disposed adjacent each other and wherein the plurality of inner vent laminations and the plurality of outer vent laminations are mounted together whereby the inner ports and the outer ports each communicate.

17. The laminations of claim 7, wherein the at least one inner port comprises a plurality of inner ports circumferentially spaced about the at least one inner vent lamination and wherein each of the inner ports are elongated along a radial direction; and the at least one outer port comprises a plurality of outer ports circumferentially spaced about the at least one outer vent lamination and wherein each of the outer ports are elongated along a radial direction.

18. The laminations of claim 16, wherein the inner vent laminations and the outer vent laminations each comprise at least one cooling aperture disposed adjacent to each other to define an axial cooling duct.

19. The laminations of claim 18, wherein the at least one cooling aperture comprises a plurality of circumferentially spaced cooling apertures and wherein each circumferentially spaced cooling aperture is disposed adjacent to each other to define a plurality of axial cooling ducts.

20. A laminated core for a motor, comprising: a plurality of laminations each of which being disposed in a non-spaced relation to an adjacent lamination and each having a disc-like configuration and wherein the plurality of laminations each are dimensioned and configured to provide for a flow of a cooling fluid traveling in a radial direction to a rotational axis of the motor; and wherein the at least one inner vent lamination and the at least one outer vent lamination are configured for a stator.

21. The laminated core of claim 20, comprising: at least one inner vent lamination comprising at least one inner port and wherein the at least one inner vent lamination has a continuous peripheral surface; and at least one outer vent lamination comprising at least one outer port that is configured whereby the at least one outer vent lamination has a discontinuous peripheral surface; wherein the at least one inner port and the at least one outer port are each dimensioned and configured to communicate to define a radial cooling duct when the at least one inner vent lamination and the at least one outer vent lamination are assembled together.

22. The laminated core of claim 21, wherein the at least one inner vent lamination comprises a plurality of inner vent laminations each disposed adjacent each other.

23. The laminated core of claim 22, wherein the at least one outer vent lamination comprises a plurality of outer vent laminations each disposed adjacent each other and wherein the plurality of inner vent laminations and the plurality of outer vent laminations are mounted together whereby the inner ports and the outer ports each communicate.

24. The laminated core of claim 21, wherein: the at least one inner port comprises a plurality of inner ports circumferentially spaced about the at least one inner vent lamination and wherein each of the inner ports are elongated along a radial direction; and the at least one outer port comprises a plurality of outer ports circumferentially spaced about the at least one outer vent lamination and wherein each of the outer ports are elongated along a radial direction.

25. The laminated core of claim 23, wherein the inner vent laminations and the outer vent laminations each comprise at least one cooling aperture disposed adjacent to each other to define an axial cooling duct.

26. The laminated core of claim 25, wherein the at least one cooling aperture comprises a plurality of circumferentially spaced cooling apertures and wherein each circumferentially spaced cooling aperture is disposed adjacent to each other to define a plurality of axial cooling ducts.

* * * * *